US007905615B2

(12) United States Patent
Abo et al.

(10) Patent No.: US 7,905,615 B2
(45) Date of Patent: Mar. 15, 2011

(54) DISPLAY DEVICE

(75) Inventors: Seigo Abo, Hitachi (JP); Masaki Tsubokura, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 760 days.

(21) Appl. No.: 11/844,372

(22) Filed: Aug. 24, 2007

(65) Prior Publication Data

US 2008/0049167 A1 Feb. 28, 2008

(30) Foreign Application Priority Data

Aug. 25, 2006 (JP) .................................. 2006-229279

(51) Int. Cl.
*G09F 13/14* (2006.01)
(52) U.S. Cl. ............. 362/97.1; 362/296.01; 362/296.05; 349/67
(58) Field of Classification Search ................. 362/609, 362/633, 97.1, 97.2, 97.4, 614, 296.05, 349; 349/67
See application file for complete search history.

(56) References Cited

U.S. PATENT DOCUMENTS

| 7,530,703 | B2 * | 5/2009 | Ryu ................................ 362/29 |
| 2006/0044779 | A1 * | 3/2006 | Lee ................................ 362/29 |
| 2009/0086121 | A1 * | 4/2009 | Sekiguchi et al. ............. 349/58 |
| 2010/0061086 | A1 * | 3/2010 | Park et al. .................... 362/97.2 |

FOREIGN PATENT DOCUMENTS

JP  2002-090736  3/2002

* cited by examiner

*Primary Examiner* — Evan Dzierzynski
(74) *Attorney, Agent, or Firm* — Antonelli, Terry, Stout & Kraus, LLP.

(57) ABSTRACT

A display device in which a plurality of tubular light sources are arranged in parallel behind the display area of a display panel, including a first reflecting member disposed behind the tubular light sources and a second reflecting member disposed on an outer periphery of a reflection surface of the first reflecting member. The second reflecting member has a reflection surface inclined so that a distance from the liquid crystal display panel to the inclined reflection surface becomes smaller in a direction from an inner edge to outer edge of the reflection surface. A notch portion is provided on the inner edge. An end portion of the tubular light source is located through the notch portion of the second reflecting member at the back of the reflection surface of the second reflecting member, and the notch portion is covered with a hood shaped member.

6 Claims, 6 Drawing Sheets

DISPLAY DEVICE

The present application claims priority from Japanese applications JP2006-229279 filed on Aug. 25, 2006, the content of which is hereby incorporated by reference into this application.

BACKGROUND OF THE INVENTION

1. Field of the Invention

The present invention relates to a display device, and more particularly to a technique effectively applied to a liquid crystal display having a reflector type back light unit in which a light source is a fluorescent lamp.

2. Description of the Related Art

Conventionally, there is a liquid crystal display using a liquid crystal display panel as a display device such as a television or personal computer (PC: Personal Computer) display. Some liquid crystal displays have a back light unit having a light source such as a fluorescent lamp disposed behind the liquid crystal display panel.

The back light unit called a reflector type has a light source disposed in an area overlapping the display surface of the liquid crystal display panel as seen from the observer. The reflector type back light unit is easy to increase the light quantity (luminance), and mainly employed for the large liquid crystal display for use in the room such as a liquid crystal television or desk top PC display.

Also, the light source for the reflector type back light unit is generally a fluorescent lamp such as a cold cathode fluorescent lamp (CFL). In recent years, the back light unit using a light emitting diode (LED) has been proposed.

By the way, the fluorescent lamp usually emits light radially from the peripheral face. Therefore, the reflector type back light unit using the fluorescent lamp is provided with a reflecting member for guiding the light, outgoing in a direction opposite to the direction where the liquid crystal display panel resides, or a direction almost parallel to the display surface, toward the liquid crystal display panel. Conventionally, in the reflector type back light unit, the reflecting member may be, for example, a reflector in which the outer periphery of a metallic plate is bent to the liquid crystal display panel and inclined.

The reflector type back light unit for the large liquid crystal display such as a liquid crystal television using a metallic frame having a beam-like horizontal plate and a side wall to increase the resistance against bending or torsion stress has been proposed (e.g., refer to the following patent document 1).

[Patent document 1] JP-A-2002-90736

SUMMARY OF THE INVENTION

For the reflector type back light unit, a high uniformity of luminance is required, in which the evenness of surface luminance in the display area of one liquid crystal display panel, namely, the value in which the minimum luminance is divided by the maximum luminance in one display area, is desirably from 0.8 to 1.

However, the conventional liquid crystal display using the reflector type back light unit has a problem that the luminance of an area overlapping the end portion or its periphery of the fluorescent lamp in the display area is lower than the luminance of the other area, for example, as seen on the same plane as the display surface of the liquid crystal display panel, so that the uniformity of luminance is lower.

Referring to FIGS. 3A to 3C and FIG. 4, one example of the back light unit having such program, and a cause of the problem will be briefly described below. FIG. 3A is a typical plan view showing one example of the schematic constitution of a liquid crystal display having a reflector type back light unit. FIG. 3B is a typical plan view showing one example of the schematic constitution of a light source and a reflector for the back light unit in an area AR2 of FIG. 3A. FIG. 3C is a typical cross-sectional view showing one example of the constitution in cross section, taken along the line C-C' in FIG. 3B. FIG. 4 is a typical plan view showing one example of a problem that arises with the liquid crystal display having the constitution as shown in FIGS. 3A to 3C.

The liquid crystal display having the reflector type back light unit has a constitution as shown in FIG. 3A, as seen from the display surface. A plurality of fluorescent lamps 2 extending in the x direction are arranged in parallel to each other in the y direction behind a liquid crystal display panel 1. Then, the liquid crystal display panel 1 or the back light unit is supported by the frame members, such as an upper frame 6 and a lower frame (not shown).

Also, the fluorescent lamp 2 and the reflector have various constitutions near the end portion of the fluorescent lamp 2 in the back light unit. One of them is shown in FIGS. 3B and 3C. The reflector comprises a first reflecting member 3 having a reflection surface 3R almost parallel to the display surface of the liquid crystal display panel 1 and a second reflecting member 4 provided around the periphery of the reflection surface 3R of the first reflecting member 3.

The second reflecting member 4 has a reflection surface 4R inclined so that the distance from the liquid crystal display panel 1 is smaller from the inner edge 4I to the outer edge. Also, the second reflecting member 4 has a notch portion 401 at the inner edge 4I, and an end portion of the fluorescent lamp 2 projects through the notch portion 401 of the second reflecting member 4 to the back side (hollow portion) of the reflection surface 4R for the second reflecting member 4. Also, an electrode 2E is provided at an end portion of the fluorescent lamp 2. The end portion of the fluorescent lamp 2 is supported by a support member 9 intended to supply power (voltage) to the electrode 2E and support the fluorescent lamp 2.

At this time, the electrode 2E of the fluorescent lamp 2 may become in a state looking from the notch portion 401 of the second reflecting member 4 as seen from the display surface, as shown in FIGS. 3B and 3C. In this state, uneven light reflection occurs between a peripheral area BL of a portion which the electrode 2E of the fluorescent lamp 2 looks at and the other area. Therefore, the luminance of light in an area 1L overlapping the end portion and its periphery of the fluorescent lamp 2 as seen from the display surface is lower than the luminance of light in the other area, as shown in FIG. 4, resulting in a problem that the uniformity of luminance in the display area is worse.

It is an object of the invention to provide a technique capable of preventing the non-uniformity of luminance in a display area for a display device having a reflector type back light unit using a fluorescent lamp.

The foregoing and other objects and novel features of the invention will be apparent from the description of the specification and the accompanying drawings.

The representative inventions as disclosed in this application are briefly outlined as follows.

(1) A display device having a display panel, and a back light unit disposed behind the display panel in which a plurality of tubular light sources are arranged in parallel behind a display area of the display panel, characterized in that the back light unit comprises the tubular light sources, a first reflecting member disposed further behind the tubular light sources as seen from the display panel and having a reflection surface almost parallel to a display surface of the display panel, a second reflecting member like a frame disposed on the outer periphery of the reflection surface of the first reflecting member, and a light diffusing plate disposed in front of the tubular light sources and the second reflecting member as seen from the display panel, wherein the second reflecting member has a reflection surface inclined so that the distance from the liquid crystal display panel is smaller from the inner edge to the outer edge and a notch portion on the inner edge, an end portion of the tubular light source is located through the notch part of the second reflecting member at the back of the reflection surface of the second reflecting member, and the notch portion of the second reflecting member is covered with a hood shaped member of which a termination position and its neighborhood project to the display panel.

(2) The display device according to (1), characterized in that the tubular light source has an electrode extending from an end portion of the tubular light source up to a region between the termination position of the notch portion for the second reflecting member and the inner edge, as seen from the plane parallel to the display surface of the display panel, and the electrode of the tubular light source is covered with the hood shaped member, as seen from the plane parallel to the display surface of the display panel.

(3) The display device according to (1) or (2), characterized in that the hood shaped member is formed integrally with the second reflecting member.

(4) The display device according to (1) or (2), characterized in that the hood shaped member is bonded with the second reflecting member by a glue material or an adhesive material.

(5) The display device according to any one of (1) to (4), characterized in that the tubular light source is a cold cathode fluorescent lamp.

(6) The display device according to any one of (1) to (5), characterized in that the display panel is a liquid crystal display panel in which a liquid crystal material is sealed in between one pair of substrates.

With the display device of the invention, it is possible to reduce uneven light reflection between the area where the notch portion of the second reflecting member is provided and the other area, and prevent the non-uniformity of luminance in the display area.

Particularly, the invention is desirably applied to a case where the tubular light source has an electrode extending from an end portion of the tubular light source up to a region between the termination position of the notch portion for the second reflecting member and the inner edge, as seen from the plane parallel to the display surface of the display panel. Then, the hood shaped member has such a size that the electrode of the tubular light source is covered with the hood shaped member, as seen from the plane parallel to the display surface of the display panel, whereby unevenness in the light reflection can be further reduced.

In the display device of the invention, the hood shaped member may be formed integrally with the second reflecting member, or bonded with the second reflecting member by a glue material or an adhesive material after being formed in a separate process from the second reflecting member.

Also, in the display device of the invention, the tubular light source is desirably a fluorescent lamp, and more desirably a cold cathode fluorescent lamp. Also, since it is necessary that the tubular light sources are arranged in parallel in the region through the display area, the fluorescent lamp may be of a U-character type bent outside the display area.

The invention may be applied to the display device of a display form in which the reflector type back light unit is disposed behind the display panel and the light from the back light unit is applied to the display panel to present the video or image to the observer. The display panel of such display form is a liquid crystal display panel in which a liquid crystal material is sealed in between one pair of substrates, for example.

DESCRIPTION OF THE PREFERRED EMBODIMENTS

An embodiment (example) of the present invention will be described below in detail with reference to the drawings. Throughout the drawings for explaining the embodiments, the same or like parts are designated by the same numerals or signs and not described repeatedly.

Embodiment

Figure 1A:
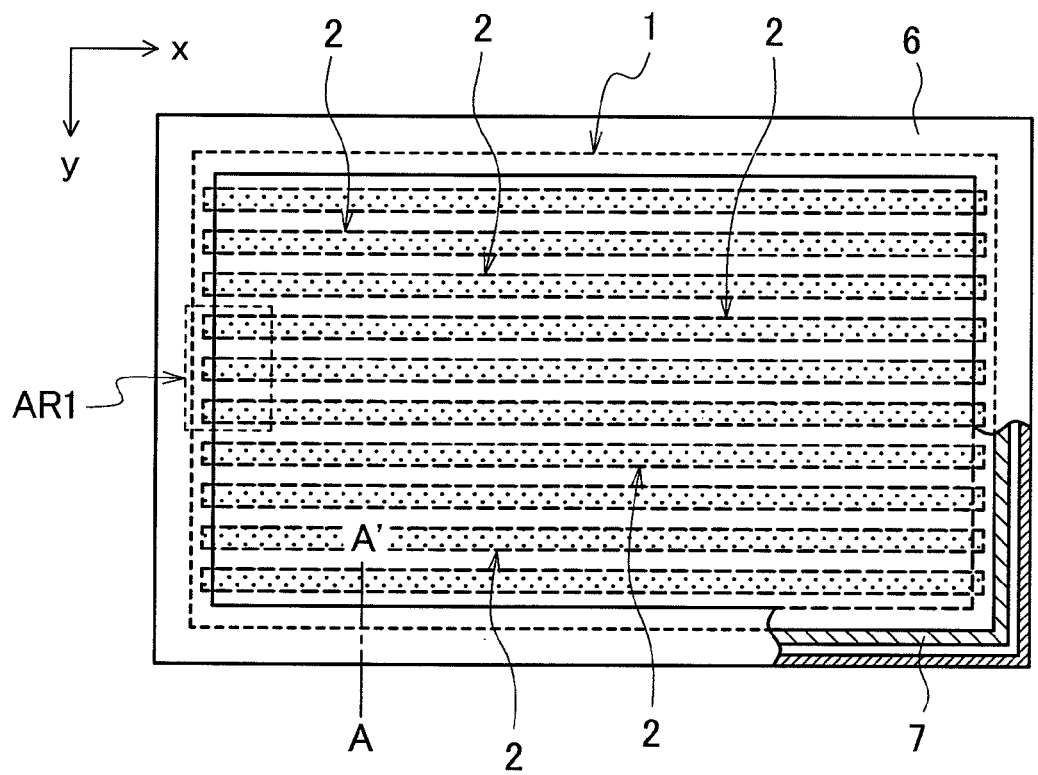
FIG. 1A is a typical plan view showing the schematic constitution of a liquid crystal display according to one embodiment of the present invention.
Figure 1B:
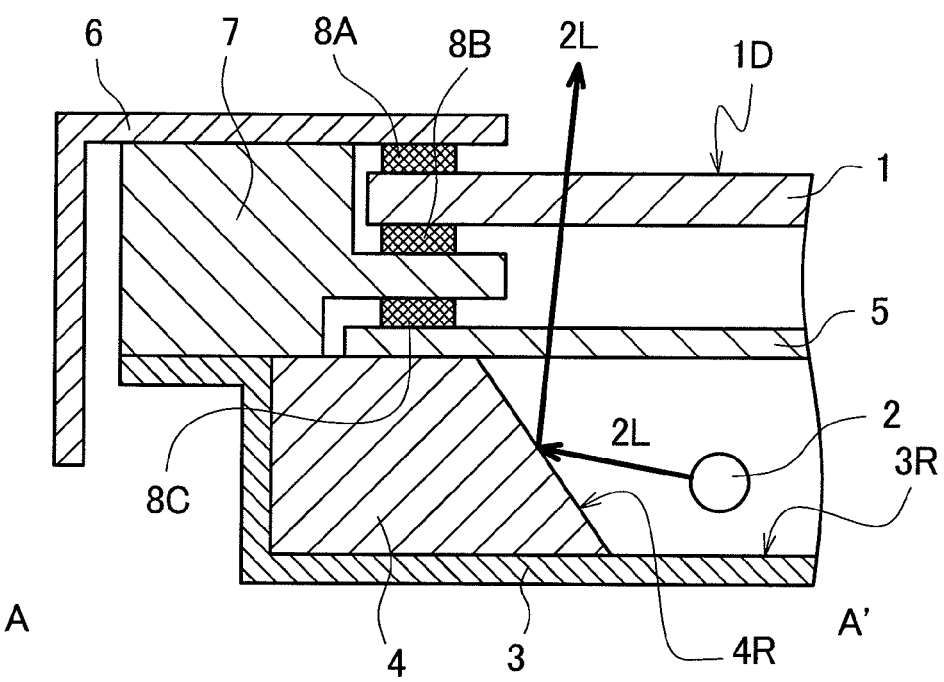
FIG. 1B is a typical cross-sectional view showing one example of the constitution in cross section, taken along the line A-A' in FIG. 1A.

FIG. 1A is a typical plan view showing the schematic constitution of a liquid crystal display according to one embodiment of the invention. FIG. 1B is a typical cross-sectional view showing one example of the constitution in cross section, taken along the line A-A' in FIG. 1A.

Figure 2A:
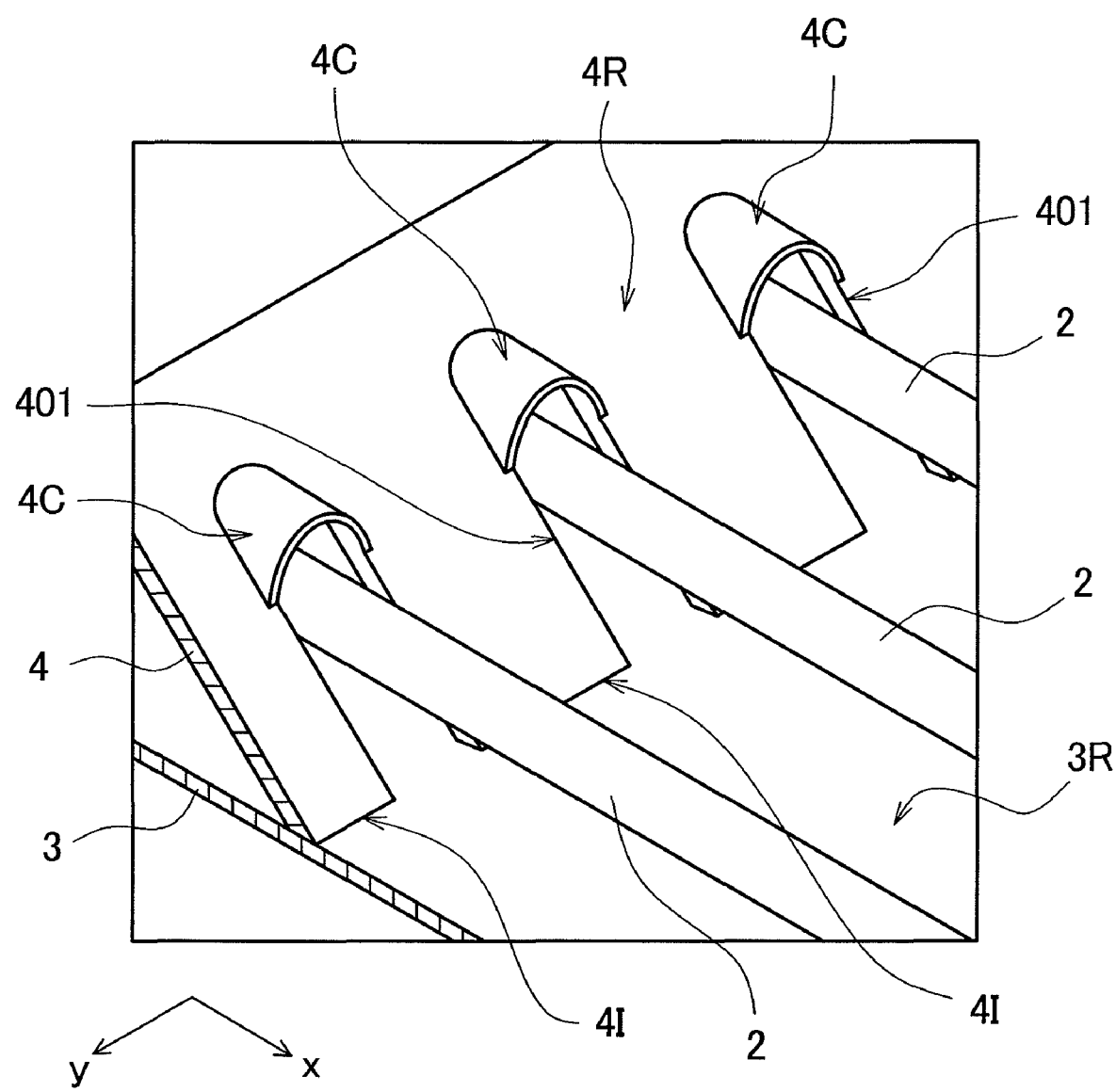
FIG. 2A is a typical perspective view showing one example of the schematic constitution of a fluorescent lamp and a reflecting member in the liquid crystal display of this embodiment.
Figure 2B:
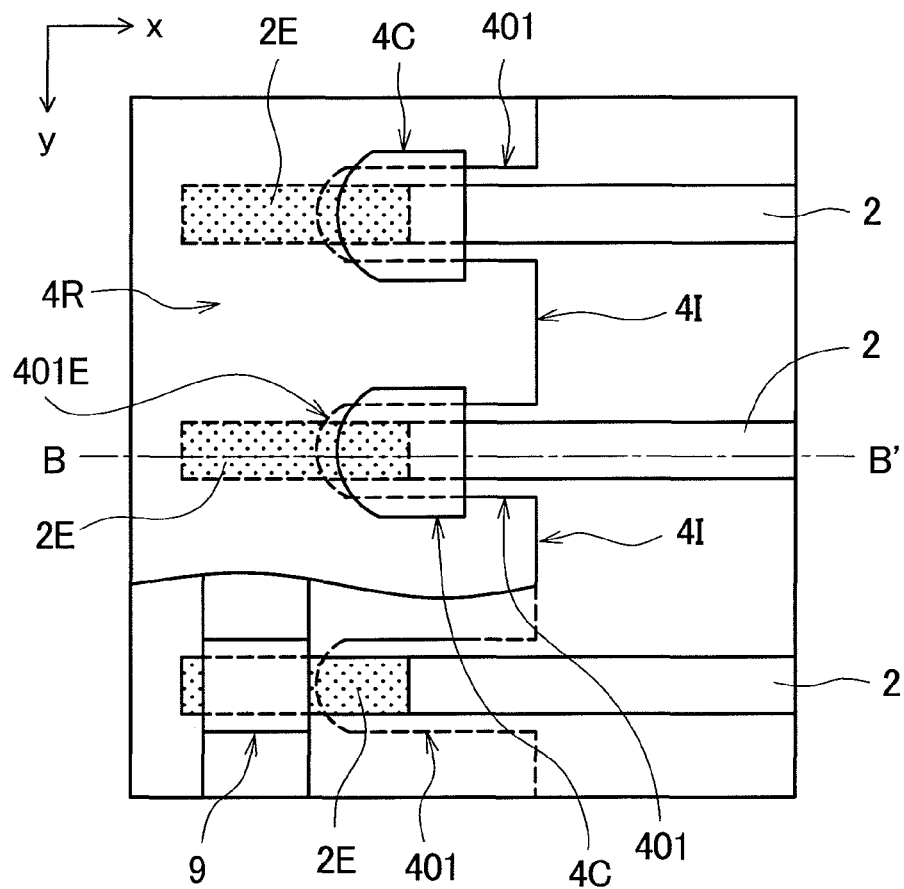
FIG. 2B is a typical plan view showing one example of the schematic constitution of the fluorescent lamp and the reflecting member in an area AR1 of FIG. 1A.
Figure 2C:
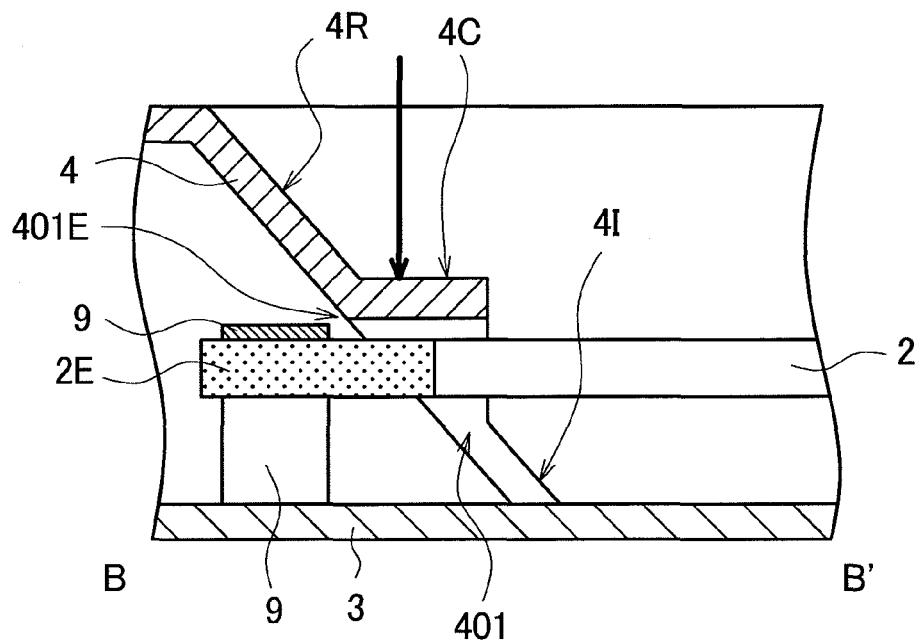
FIG. 2C is a typical cross-sectional view showing one example of the constitution in cross section, taken along the line B-B' in FIG. 2B.
Figure 3A:
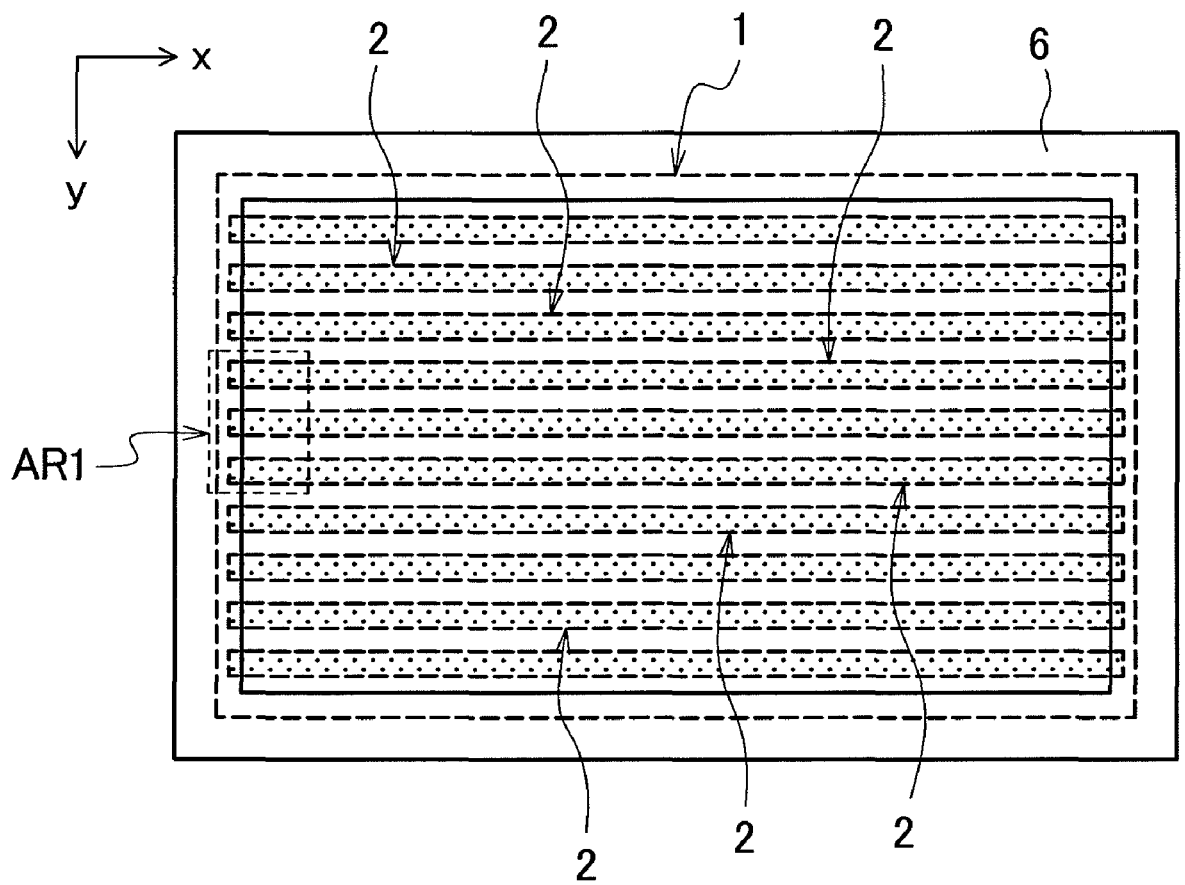
FIG. 3A is a typical plan view showing one example of the schematic constitution of a liquid crystal display having a reflector type back light unit.
Figure 3B:
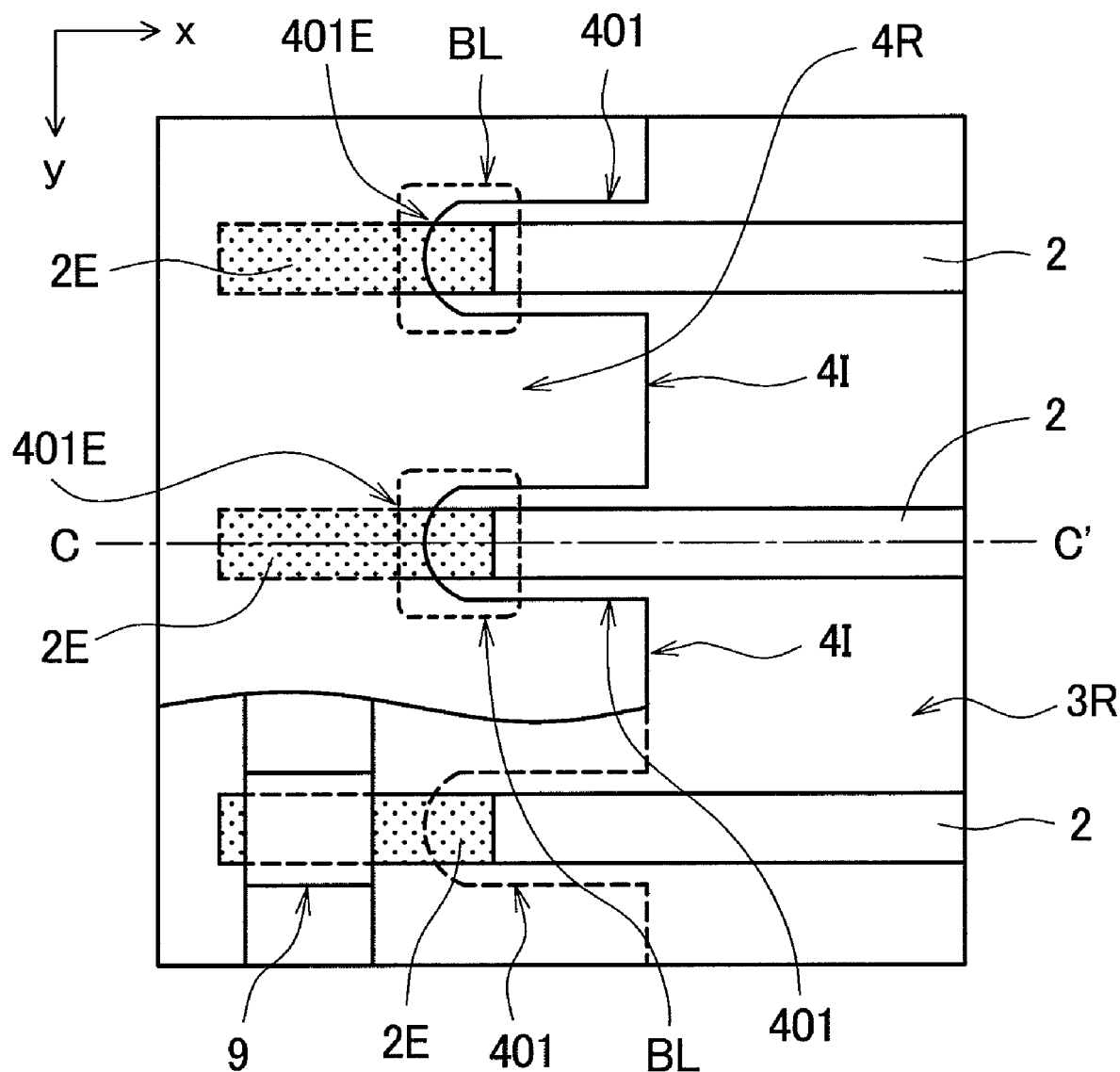
FIG. 3B is a typical plan view showing one example of the schematic constitution of a light source and a reflector for the back light unit in an area AR2 of FIG. 3A.
Figure 3C:
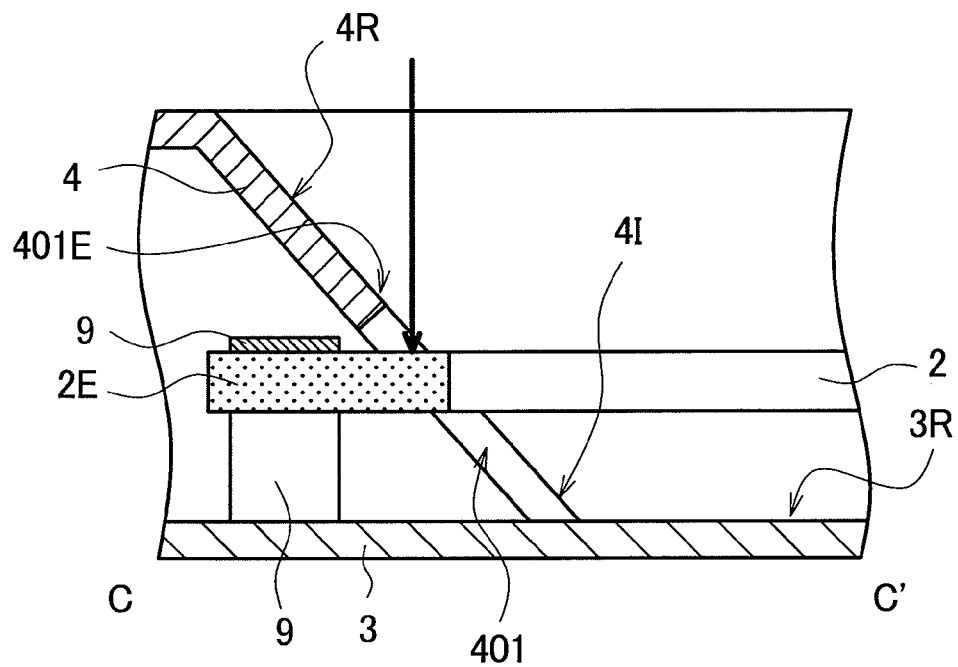
FIG. 3C is a typical cross-sectional view showing one example of the constitution in cross section, taken along the line C-C' in FIG. 3B.

FIG. 2A is a typical perspective view showing one example of the schematic constitution of a fluorescent lamp and a reflecting member in the liquid crystal display of this embodiment. FIG. 2B is a typical plan view showing one example of the schematic constitution of the fluorescent lamp and the reflecting member in an area AR1 of FIG. 1A. FIG. 2C is a typical cross-sectional view showing one example of the constitution in cross section, taken along the line B-B' in FIG. 2B.

The invention is a display device having a reflector type back light unit with a fluorescent lamp as the light source disposed behind a display panel. Such display device is a transmissive or transflective liquid crystal display having a liquid crystal display panel in which the liquid crystal material is sealed in between one pair of substrates.

The transmissive liquid crystal display has the fluorescent lamps 2 such as cold cathode fluorescent lamps arranged in parallel behind the liquid crystal display panel 1 as seen from the observer, as shown in FIG. 1A or 1B. Herein, the fluorescent lamps 2 may have a plurality of tubular light emitting areas arranged in parallel in the display area of the liquid crystal display panel 1. Therefore, the fluorescent lamp 2 may be the I-character type fluorescent lamp, or U-character type fluorescent lamp bent outside the display area.

Also, a first reflecting member 3 having a reflection surface 3R almost parallel to a display surface 1D of the liquid crystal display panel 1 is provided further behind the fluorescent lamp 2 as seen from the liquid crystal display panel 1. Also, a second reflecting member 4 having a reflection surface 4R inclined to guide a light 2L outgoing from the fluorescent lamp 2 in a direction almost parallel to the display surface 1D toward the liquid crystal display panel 1 is disposed on the outer periphery of the reflection surface 3R of the first reflecting member 3. The first reflecting member 3 and the second reflecting member 4 are screwed, for example.

An optical sheet such as a light diffusing plate 5 that increases the uniformity of luminance in the surface light applied to the liquid crystal display panel 1 is disposed between the liquid crystal display panel 1 and the fluorescent lamp 2 and the second reflecting member 4.

Also, the liquid crystal display panel 1 is supported in such a manner as to sandwich the outer peripheral part of the liquid crystal display panel 1 between a first frame member 6 made of metal called an upper frame and a second frame member 7 made of resin called a middle frame or mold frame, for example. Then, the first frame member 6 and the second frame member 7 are screwed, for example. Also, the cushion materials 8A and 8B are interposed between the first frame member 6 and the liquid crystal display panel 1, and between the second frame member 7 and the liquid crystal display panel 1.

Also, the first reflecting member 3 is a box-like member, of which the outer periphery is bent, having a function as a frame member called a lower frame, and internally accommodates the fluorescent lamp 2 and the second reflecting member 4. And an end portion of the first reflecting member 3 and the second frame member 7 are screwed, for example. Also, a cushion material 8C is interposed between the second frame member 7 and the light diffusing plate 5.

In the liquid crystal display of this embodiment, the fluorescent lamp 2 and the first reflecting member 3, as well as the second reflecting member 4 in an area AR1 as shown in FIG. 1A where the end portions of the fluorescent lamps 2 are provided are constituted as shown in FIGS. 2A to 2C. That is, in the area where the end portions of the fluorescent lamps 2 are provided, the second reflecting member 4 is like a thin plate along the reflection surface 4R (inclined plane), and the area where the first reflecting member 3 and the second reflecting member 4 overlap from the plane view is hollow.

Also, the second reflecting member 4 has a notch portion 401 at an inner edge 4I. An end portion of the fluorescent lamp 2 projects through the notch portion 401 of the second reflecting member 4 to the back side of the reflection surface 4R for the second reflecting member 4, that is, a hollow portion in the area where the first reflecting member 3 and the second reflecting member 4 overlap. Also, an electrode 2E is provided at the end portion of the fluorescent lamp 2. The end portion of the fluorescent lamp 2 is supported by a support member 9 intended to supply power (voltage) to the electrode 2E and support the fluorescent lamp 2.

Further, in the liquid crystal display of this embodiment, a hood shaped member 4C projecting in a direction from the reflection surface 4R of the second reflecting member 4 to the liquid crystal display panel 1 is provided in a termination position 401E and its periphery of the notch portion 401 for the second reflecting member 4.

The hood shaped member 4C may be formed integrally with the second reflecting member 4, when the second reflecting member 4 is formed by injection molding using a mold, or formed separately from the second reflecting member 4 and bonded with the second reflecting member 4 by a glue material or an adhesive material, for example.

Figure 4:
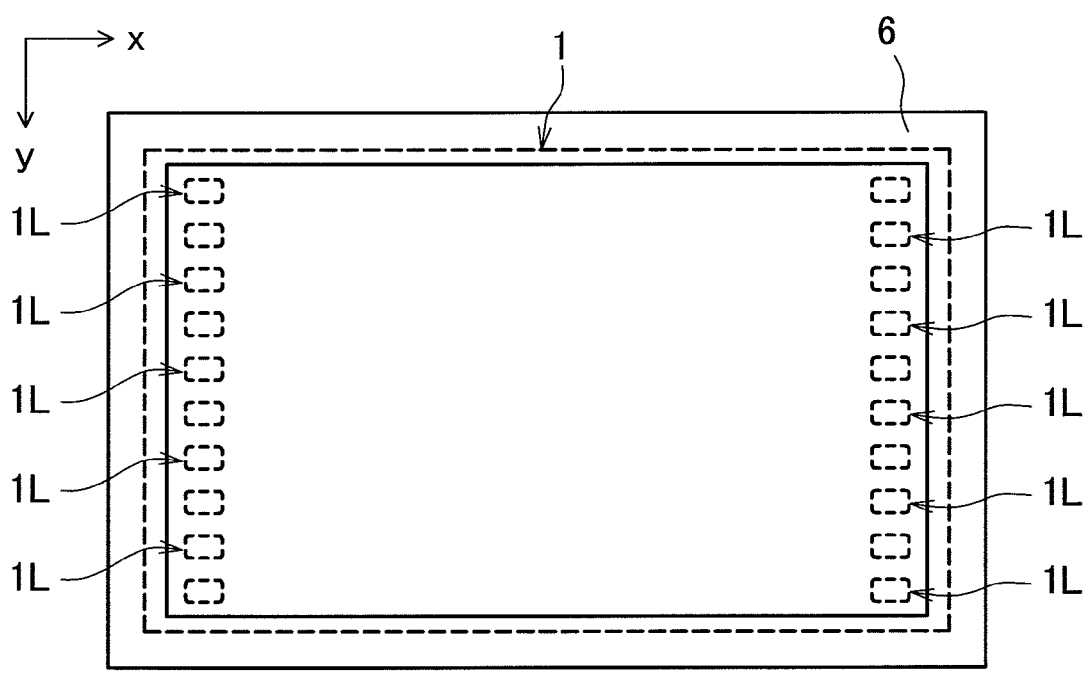
FIG. 4 is a typical plan view showing one example of a problem that arises with the liquid crystal display having the constitution as shown in FIGS. 3A to 3C.

If this hood shaped member 4C is provided, the electrode 2E of the fluorescent lamp 2 is covered with the hood shaped member 4C and invisible to the observer, as seen from the display surface, even when the electrode 2E of the fluorescent lamp 2 extends up to the almost same plane position as the notch portion 401E (reflection surface 4R) of the second reflecting member 4, as shown in FIGS. 2B and 2C. Therefore, it is possible to reduce an unevenness in the light reflection caused by the electrode 2E of the fluorescent lamp 2, which occurs at the notch portion 401 of the second reflecting member 4. As a result, the luminance is not diminished in the area 1L at the end portion of the liquid crystal display panel 1, and the non-uniformity of light luminance in the display area is prevented, as shown in FIG. 4.

Though the hood shaped member 4C is provided as shown in FIGS. 2B and 2C, of course, the hood shaped member may be provided to cover from the termination position 401E of the notch portion 401 for the second reflecting member 4 to the inner edge 4I.

While the invention has been specifically described above by way of example, the invention is not limited to the above embodiment, but various changes may be made without departing from the spirit or scope of the invention.

For example, in the above embodiment, when the second reflecting member 4 is cut in the x direction or y direction, the reflection surface 4R is a flat inclined surface monotonously increasing from the inner edge 4I to the outer periphery. Additionally, of course, the reflection surface 4R when the second reflecting member 4 is cut in the x direction or y direction may be concave or convex.

Also, in this embodiment, the first reflecting member 3 has a function of the lower frame as well, but alternatively the first reflecting member 3 and the lower frame may be separate members.

Though in the above embodiment, the transmissive liquid crystal display has been taken as one example of the display device to which the invention can be applied, the invention may be applicable to any display device as far as it has the same constitution and display form as the transmissive liquid crystal display having the reflector type back light unit.

The invention is directed to the display device having the reflector type back light unit, particularly, the constitution of the back light unit, as described above. When the light outgoing from the tubular light source such as the fluorescent lamp is converted into surface light and applied to the display panel, the non-uniformity of light luminance on a plane can be prevented. Therefore, the constitution adopted in the above embodiment, for example, may be applied to a light box for use in observing the negative or positive film of photo, or tracing a rough draft.

What is claimed is:

1. A display device having a display panel, and a back light unit disposed behind the display panel in which a plurality of tubular light sources are arranged in parallel behind a display area of the display panel, characterized in that:

the back light unit comprises:

the tubular light sources;

a first reflecting member disposed further behind the tubular light sources as seen from the display panel and having a reflection surface almost parallel to a display surface of the display panel;

a second reflecting member like a frame disposed on an outer periphery of the reflection surface of the first reflecting member; and a light diffusing plate disposed in front of the tubular light sources and the second reflecting member as seen from the display panel;

wherein the second reflecting member has an inclined reflection surface having a notch portion on an inner edge thereof, the inclined reflection surface being inclined so that a distance from the liquid crystal display panel to the inclined reflection surface becomes smaller in a direction from the inner edge to an outer edge of the inclined reflection surface;

an end portion of the tubular light source is located through the notch portion of the second reflecting member at the back of the reflection surface of the second reflecting member; and the notch portion of the second reflecting member is covered with a hood shaped member which projects toward the display panel.

2. The display device according to claim 1, characterized in that the tubular light source has an electrode extending from an end portion of the tubular light source up to a region between a termination position of the notch portion for the second reflecting member and the inner edge, as seen from a plane parallel to the display surface of the display panel, and the electrode of the tubular light source is covered with the hood shaped member, as seen from the plane parallel to the display surface of the display panel.

3. The display device according to claim 1, characterized in that the hood shaped member is formed integrally with the second reflecting member.

4. The display device according to claim 1, characterized in that the hood shaped member is bonded with the second reflecting member by a glue material or an adhesive material.

5. The display device according to claim 1, characterized in that the tubular light source is a cold cathode fluorescent lamp.

6. The display device according to claim 1, characterized in that the display panel is a liquid crystal display panel in which a liquid crystal material is sealed in between one pair of substrates.

* * * * *